(12) United States Patent
Ambrose et al.

(10) Patent No.: US 9,297,539 B2
(45) Date of Patent: Mar. 29, 2016

(54) ASSEMBLY FOR ATTACHMENT TO REAR WALL OF APPLIANCE CAVITY

(71) Applicant: SSW Holding Company, Inc., Fort Smith, AR (US)

(72) Inventors: Jeffrey Alan Ambrose, Evansville, IN (US); Jason Robert Yochum, Haubstadt, IN (US); Randall Kelly Dhom, Newburgh, IN (US)

(73) Assignee: SSW Holding Company, Inc., Fort Smith, AK (US)

( * ) Notice: Subject to any disclaimer, the term of this patent is extended or adjusted under 35 U.S.C. 154(b) by 376 days.

(21) Appl. No.: 13/800,054

(22) Filed: Mar. 13, 2013

(65) Prior Publication Data
US 2014/0026882 A1 Jan. 30, 2014

Related U.S. Application Data

(60) Provisional application No. 61/676,660, filed on Jul. 27, 2012.

(51) Int. Cl.
*F24C 15/16* (2006.01)
*B23P 19/00* (2006.01)

(52) U.S. Cl.
CPC ............... *F24C 15/16* (2013.01); *B23P 19/00* (2013.01); *Y10T 29/49826* (2015.01)

(58) Field of Classification Search
CPC ........ A47B 57/06; A47B 57/32; F24C 15/16; F25D 25/024
USPC .......................... 126/337 R, 337 A, 339, 332; 108/106–110
See application file for complete search history.

(56) References Cited

U.S. PATENT DOCUMENTS

| | | | | |
|---|---|---|---|---|
| 1,953,688 A | * | 4/1934 | Otte | 108/137 |
| 1,974,983 A | * | 9/1934 | Cook | 108/137 |
| 2,113,544 A | * | 4/1938 | Haley | 312/400 |
| 2,576,407 A | * | 11/1951 | McDowell | 312/334.19 |
| 2,868,607 A | * | 1/1959 | Squire | 312/332 |
| 3,019,071 A | * | 1/1962 | Davis | 312/308 |
| 3,311,072 A | * | 3/1967 | Pattison | 108/143 |
| 3,344,779 A | * | 10/1967 | Johnson | 126/19 R |
| 3,489,136 A | * | 1/1970 | Bucellato | 126/337 R |
| 3,779,623 A | * | 12/1973 | Motohashi | 312/257.1 |
| 3,984,163 A | * | 10/1976 | Boorman et al. | 312/408 |
| 5,211,461 A | * | 5/1993 | Teufel et al. | 312/334.4 |
| 5,322,365 A | * | 6/1994 | Teufel et al. | 312/330.1 |
| 5,405,196 A | * | 4/1995 | Shoup et al. | 312/351 |
| 5,484,196 A | * | 1/1996 | Kim | 312/242 |
| 5,486,045 A | * | 1/1996 | Dasher | 312/406 |
| 5,553,936 A | * | 9/1996 | Dasher et al. | 312/408 |

(Continued)

*Primary Examiner* — Jorge Pereiro
(74) *Attorney, Agent, or Firm* — Marshall, Gerstein & Borun LLP

(57) ABSTRACT

A sliding rack assembly includes an rack, a pair of retention members supporting the rack, and a pair of rear wall retainers. Each retention member includes a slide assembly and a retention plate fixed to the slide assembly. Each retention plate includes a front end for being toward an opening of the cavity and a rear end for being disposed toward a rear wall of the cavity. The rear end of the retention plate includes a holding feature. The rear wall retainers are for being fixed to the rear wall of the cavity. Each rear wall retainer includes a plurality of vertically spaced retention features. Each retention feature is for connecting with a holding feature of a retention member to prevent the retention members from tipping inwardly and separating from the rear wall retainers.

67 Claims, 13 Drawing Sheets

(56) References Cited

U.S. PATENT DOCUMENTS

| | | | |
|---|---|---|---|
| 5,681,102 A * | 10/1997 | Forsgren | 312/334.1 |
| 5,893,620 A * | 4/1999 | Birgelis | 312/408 |
| 6,067,981 A * | 5/2000 | Peter et al. | 126/337 R |
| 6,089,685 A * | 7/2000 | Ryan et al. | 312/351 |
| 6,789,861 B1 * | 9/2004 | Dobberstein | 312/330.1 |
| 7,102,105 B2 * | 9/2006 | Oh | 219/400 |
| 7,188,916 B2 * | 3/2007 | Silvestro et al. | 312/334.4 |
| 7,281,633 B2 * | 10/2007 | Hartman et al. | 211/26 |
| 7,350,884 B2 * | 4/2008 | Palker et al. | 312/334.1 |
| 7,547,080 B2 * | 6/2009 | Hightower | 312/249.4 |
| 7,721,728 B2 * | 5/2010 | Ho Kim et al. | 126/198 |
| 7,735,481 B1 * | 6/2010 | Kalsi et al. | 126/337 R |
| 8,210,626 B2 * | 7/2012 | Shin et al. | 312/408 |
| 8,226,184 B2 * | 7/2012 | Kang et al. | 312/408 |
| 8,740,322 B2 * | 6/2014 | Moon et al. | 312/408 |
| 8,820,314 B1 * | 9/2014 | Johnson et al. | 126/339 |
| 8,851,591 B2 * | 10/2014 | Meier et al. | 312/410 |
| 8,864,190 B2 * | 10/2014 | Chang et al. | 292/273 |
| 8,919,339 B2 * | 12/2014 | Mazzetti et al. | 126/339 |
| 8,944,621 B2 * | 2/2015 | Driver et al. | 362/92 |
| 8,960,827 B2 * | 2/2015 | McMillin et al. | 312/408 |
| 9,010,890 B2 * | 4/2015 | Eckartsberg | 312/408 |
| 2006/0131297 A1 * | 6/2006 | Kim et al. | 219/394 |
| 2006/0131298 A1 * | 6/2006 | Seuk Oh | 219/400 |
| 2006/0196495 A1 * | 9/2006 | Kim et al. | 126/198 |
| 2007/0284982 A1 * | 12/2007 | Brexler et al. | 312/334.38 |
| 2009/0084914 A1 * | 4/2009 | Picken et al. | 248/206.5 |
| 2012/0017414 A1 * | 1/2012 | Cerniglia | 29/428 |
| 2012/0097147 A1 * | 4/2012 | Steurer et al. | 126/339 |

* cited by examiner

ASSEMBLY FOR ATTACHMENT TO REAR WALL OF APPLIANCE CAVITY

CROSS-REFERENCE TO RELATED APPLICATIONS

The priority benefit of U.S. Provisional Application No. 61/676,660, filed Jul. 27, 2012, is hereby claimed and the entire contents thereof are incorporated herein by reference.

FIELD OF THE DISCLOSURE

The present disclosure is directed to racks and, more particularly, to sliding racks for appliances such as ovens.

BACKGROUND

Sliding oven racks include slide assemblies for enabling the oven rack to be slid in and out of the oven cavity. The slide assemblies typically include two or more interconnected c-shaped forms, depending on the desired functionality, with ball bearings residing between the forms for facilitating movement.

Conventionally, sliding oven racks such as these include a sub-frame to provide additional assembly strength and to address premature ball bearing failure, which can often result from side-to-side movement of the slide assemblies, thereby leading to torsional over-loading. This torsional over-loading is often referred to as "toe-in," meaning that the weight of the oven rack and bearing assemblies, over time, can cause the tops of the slide assemblies to begin to tip or roll inwardly toward each other. In the prior art, toe-in can occur when the slide assemblies are not properly attached to the left and right sidewalls of the oven cavity. This will result in the entire assembly being rendered useless over time.

To combat toe-in, some sliding oven rack assemblies include anti-tip and retention design elements that interact with the left and right lateral sidewalls of the oven cavity. In particular, these types of assemblies require design elements that abut, capture, or interface with ribs or other formations on the sidewalls or with wire ladders attached to the sidewalls. These designs require added complexity to the sidewalls and result in higher costs. Often times in order to implement these types of prior art sliding oven rack assemblies, substantial and costly redesigns are required on the part of the original equipment manufacturer.

GENERAL DESCRIPTION

The present disclosure eliminates the need for a sub-frame and utilizes features on the rear wall of the oven cavity to prevent horizontal and vertical movement of the assembly. So configured, the present disclosure provides for sliding extension for easy access to cooked products, while simultaneously achieving safe retention of the entire assembly within the oven cavity or cavity of another appliance.

As will be described below, the examples provided in the present disclosure lack a sub-frame and also combat the tendency of toe-in that is common in prior art assemblies that also lack a sub-frame. The absence of a sub-frame also helps to reduce material costs versus prior art designs, and also, because of the reduction of material, faster preheat times can be realized.

DETAILED DESCRIPTION

As mentioned, one version of the present disclosure is directed to a sliding rack assembly such an oven rack assembly that achieves anti-tip and assembly retention functionality through interaction with the rear wall of the oven cavity. So configured, the construct disclosed herein does not require changes to the sidewalls of the oven cavity. Rather, the present disclosure only requires an easy modification to the existing rear wall, thereby avoiding costly sidewall redesigns by the original equipment manufacturer(s). In the present disclosure, and as will be described in more detail, anti-tip and assembly retention within the oven cavity are achieved through the use of retention members that insert into rear wall retainers. The sidewalls of the oven provide support for the assembly and the rear wall retainer acts to provide anti-tip and retention for the assembly through interaction with the retention member. In the disclosed version, the rear wall retainers do not provide vertical support for the oven rack and retention members. However, in other versions, it is possible that the rear wall retainers provide this supporting function as well. The interaction between the rear wall retainers and retention members also help stabilize the assembly and thus prevent the occurrence of the phenomena commonly referred to as "toe-in." In addition to the foregoing, the present disclosure incorporates several features in order to facilitate easy installation and removal of the assembly. Examples of these various details and features will now be described with reference to the Figs.

Figure 1:
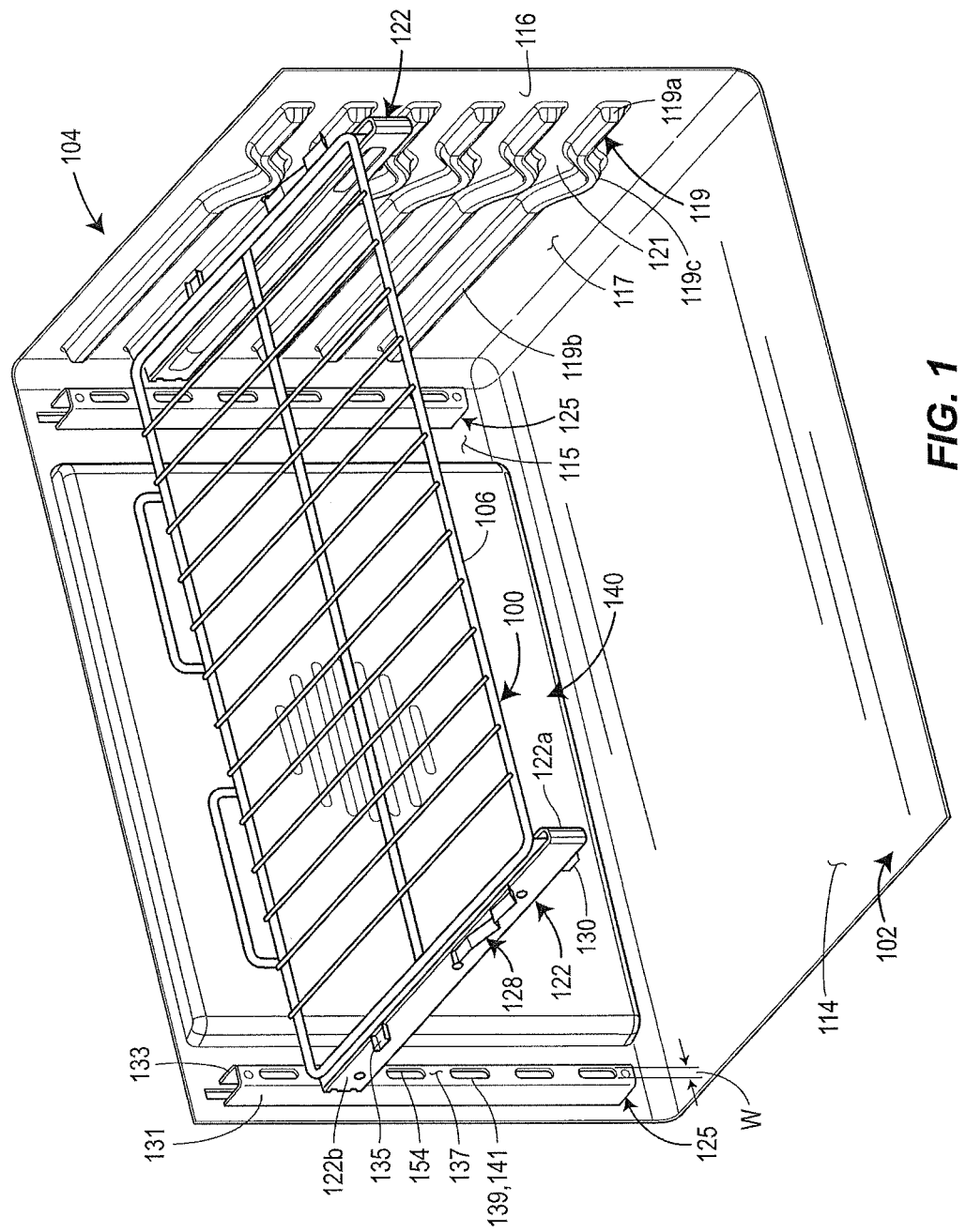
FIG. 1 is a partial perspective view of one version of a sliding oven rack assembly and oven cavity constructed in accordance with the principles of the present disclosure.

FIG. 1 illustrates one version of a sliding rack assembly 100 disposed within a cavity 102 of an appliance such as an oven 104, for example. The cavity 102 includes a pair of opposing sidewalls 117, one of which is removed for the sake of clarity, a rear wall 115, a bottom wall 114, and a front opening 116. The sidewalls 117, rear wall 115, and bottom 114 can generally be referred to as being part of an oven liner and can include stamped sheet metal, for example, coated with porcelain or some other protective material(s). Although also not shown for clarity, the cavity 102 would also include a top wall as is conventionally known. Finally, because the disclosed example includes an oven 104, the cavity 102 can include a fan cover 140 such as a convection fan cover mounted to the rear wall 115 in a conventional manner. Similar to the other aspects of the cavity 102, the fan cover 140 can also be constructed from stamped sheet metal and coated with porcelain, for example, or some other protective material(s).

The left and right sidewalls 117 of the presently disclosed version of the cavity 102 include a plurality of ribs 119 formed integrally therewith. That is, the ribs 119 of this version can be formed as one-piece with the sidewalls 117 during a stamping or other process, for example. In the depicted version, the sidewalls 117 each include six (6) ribs 119 spaced vertically about the sidewalls 117, but this number could be different for different applications. Each rib 119 includes a fore portion 119a and an aft portion 119b separated by a contoured portion 119c that dips downward to define a v-form 121.

Figure 3:
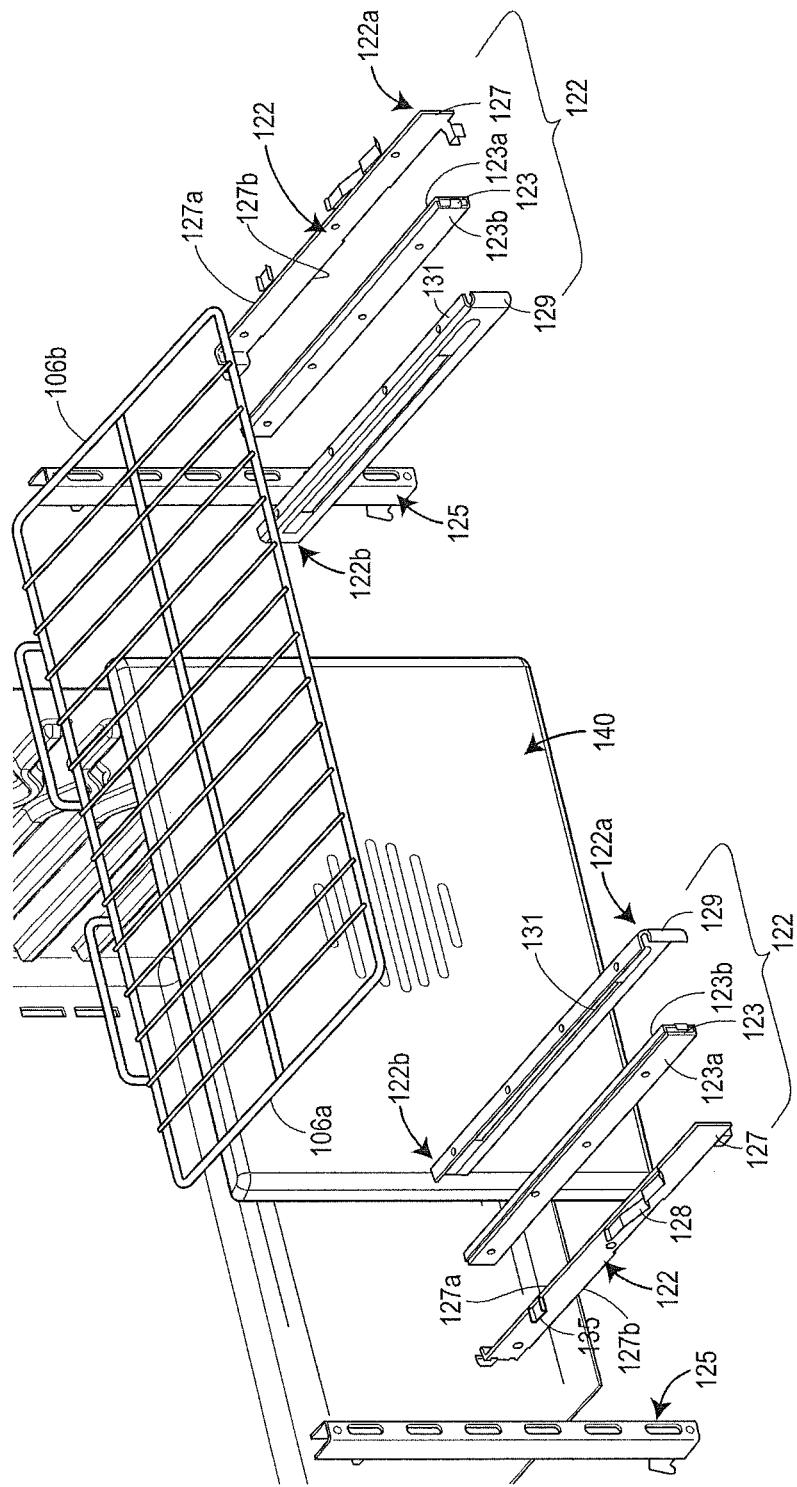
FIG. 3 is an exploded perspective view of the sliding oven rack assembly and oven cavity of FIG. 1.

Still referring to FIG. 1, the sliding rack assembly 100 includes a rack 106, a pair of retention members 122, and a pair of rear wall retainers 125. The rack 106 in the disclosed version can include a relatively conventional wire oven rack, as shown. In some versions, the rack 106 can be porcelain-coated or otherwise treated with other protective material(s), for example. As shown, the retention members 122 are located under the rack 106 at opposite sides thereof, and support the sliding rack assembly 100 in the cavity 102 on the side ribs 119, as will be described in more detail below. With reference to FIG. 3, each retention member 122 includes a front end 122a, a rear end 122b, a slide assembly 123, an outboard retention plate 127, and an inboard retention plate 129. The front ends 122a are located near the front opening 116 of the cavity 102. The rear ends 122b are located near the rear wall 115 of the cavity 102. The slide assemblies 123 can include conventional slide assemblies, having two or more interconnected c-shaped forms, for example, with ball bearings residing between the forms for facilitating sliding movement. For example, in applications where the rack 106 only needs to be slid halfway out of the cavity 102 (e.g., a partial extension rack), the slide assembly 123 might only include two interconnected forms. However, in applications where it is desirable for the rack 106 to be slid to extend completely out of the cavity 102 (e.g., a full extension rack), the slide assembly 123 can include more than two forms. Regardless, in the disclosed version, the outboard retention plate 127 is fixed to an outboard side surface 123a of the slide assembly 123 and the inboard retention plate 129 is fixed to an inboard side surface 123b of the slide assembly 123. This fixation can be achieved by fasteners such as one or more rivets or screws, or by some other means.

Figure 5:
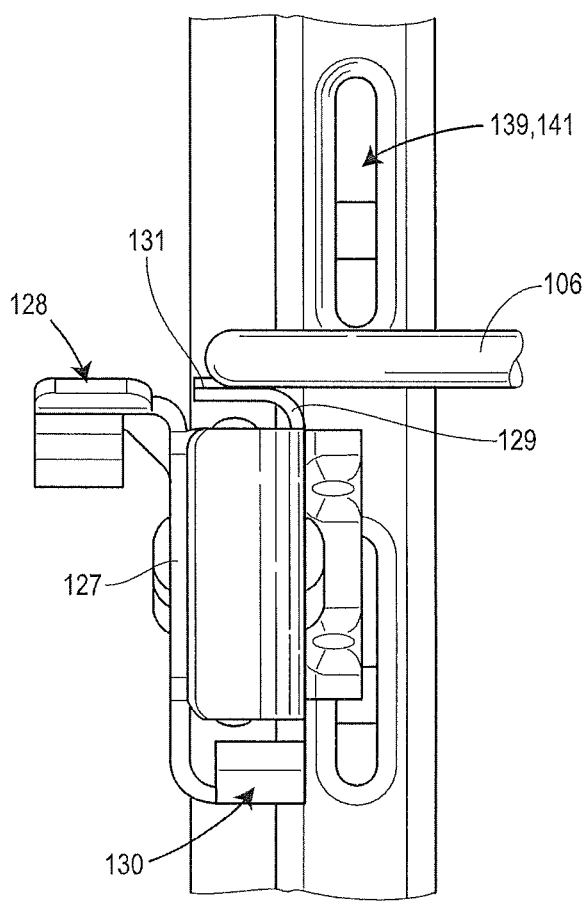
FIG. 5 is an end view of the assembly of FIGS. 1-3, taken generally from the perspective of line 5-5 in FIG. 2.

As shown in FIGS. 3 and 5, the inboard retention plates 129 each includes a top plate portion 131 that extends generally horizontally outward above the corresponding slide assembly 123 when assembled. In the disclosed version, the top plate portions 131 of the inboard retention plates 129 are fixed to outermost frame wires 106a, 106b of the rack 106 via one or more welded joints, one or more fasteners, or otherwise. So configured, when the retention members 122 are fixed into the rear wall retainers 125, the rack 106 can be slid in and out of the cavity 102 via sliding movement of the inboard retention plates 129 and inboard side surfaces 123b of the slide assemblies 123, while the outboard retention plates 127 and outboard side surfaces 123a of the slide assemblies 123 remain fixed in place. One aspect of the present disclosure that ensures that these components remain fixed in place is the rear wall retainers 125.

Figure 2:
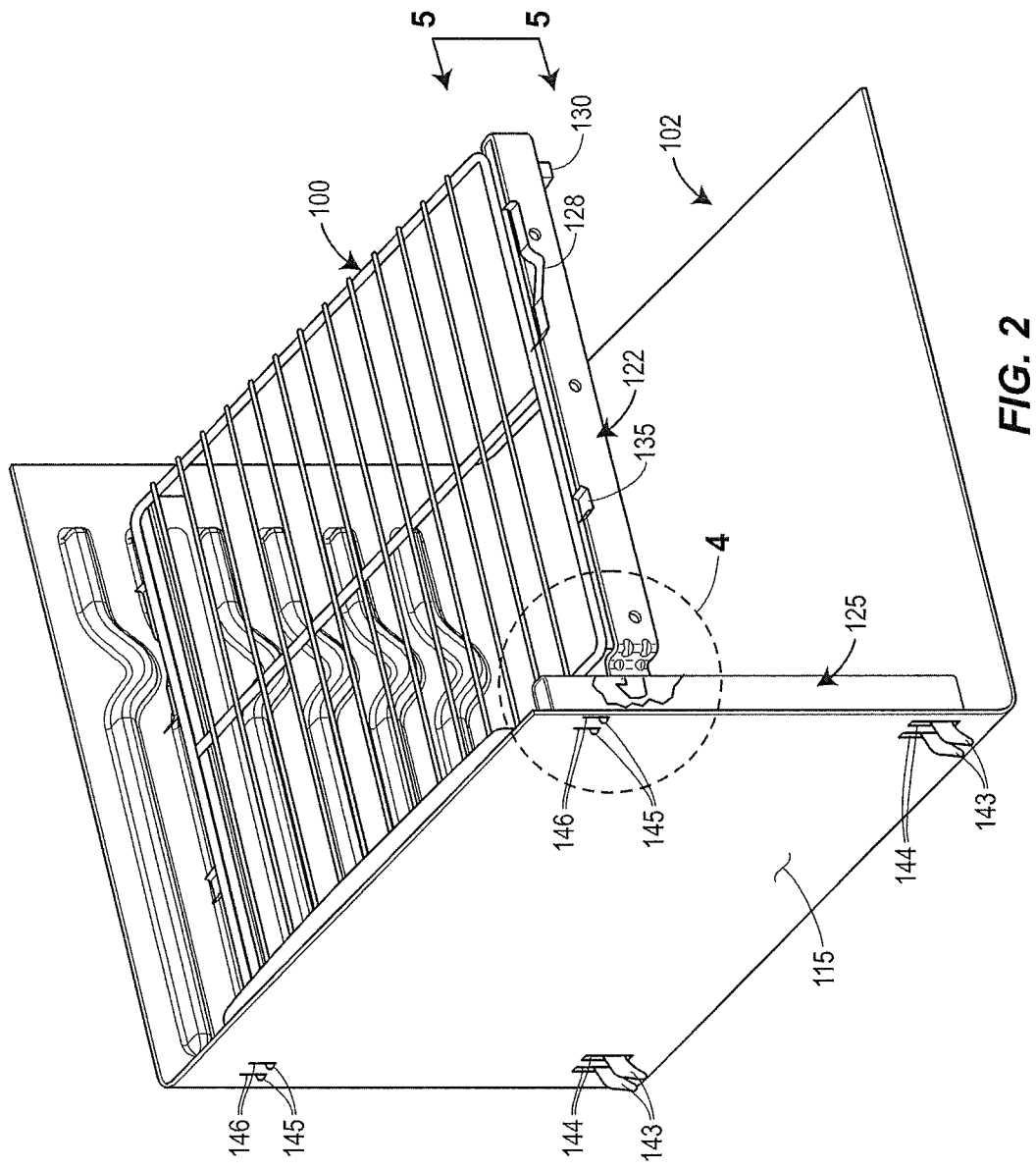
FIG. 2 is another partial perspective view of the sliding oven rack assembly and oven cavity of FIG. 1.

That is, the pair of rear wall retainers 125 are adapted to be fixed in the cavity 102 at the rear wall 115. As shown in FIGS. 1-3, for example, each rear wall retainer 125 of the present version of the assembly 100 includes an elongated member extending vertically along the rear wall 115 of the cavity 102. Each retainer 125 of this version can include a generally metal form having a U-shaped cross-section defined by opposing lateral walls 131, 133 and a front wall 137. The front wall 137 includes a plurality of vertically spaced retention features 139, which in the disclosed version include elongated apertures 141.

Referring to FIG. 2, it can be further seen that the present version of the rear wall retainers 125 are fixed directly to the rear wall 115 of the cavity 102. That is, the rear wall retainers 125 each include a pair of lower tabs 143 extending through a corresponding pair of lower slots 144 in the rear wall 115 and a pair of upper tabs 145 extending through a corresponding pair of upper slots 146 in the rear wall 115. At least the lower tabs 143 of the rear wall retainers 125 are angled slightly downward to locate and secure the rear wall retainers 125 to the rear wall 115. Although not shown, the present assembly 100 could further includes one or more weld joints or fasteners such as screws or rivets, for example, for further securing the rear wall retainers 125 to the rear wall 115. So configured, the rear wall retainers 125 of this version are fixed directly to the rear wall 115 of the cavity 102.

Figure 4:
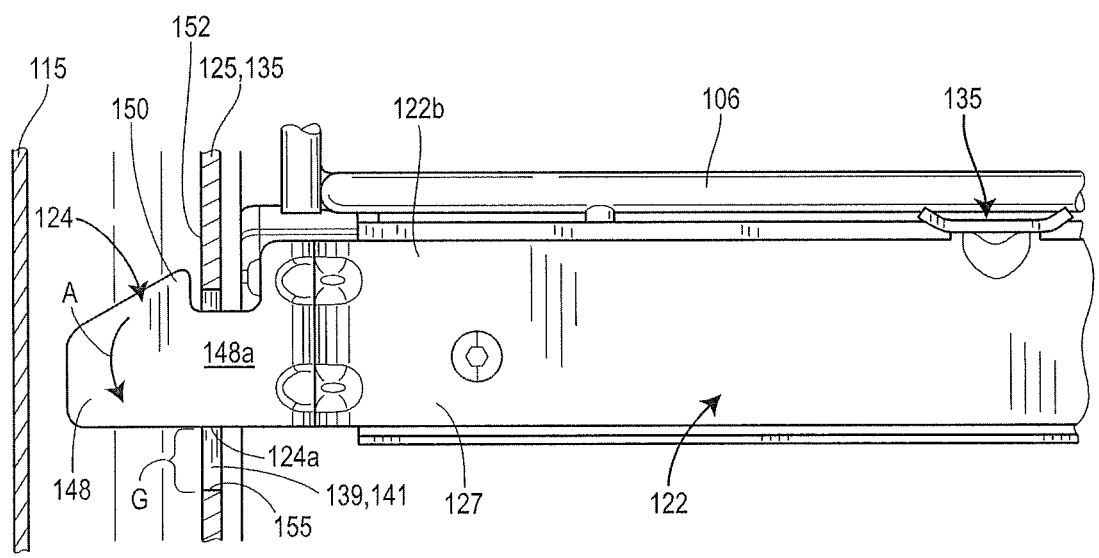
FIG. 4 is a side detail view of the assembly of FIGS. 1-3, taken generally from circle 4 in FIG. 2.

Again, as mentioned, the rear wall retainers 125 serve anti-tip and retention functions by connecting to the retention members 122 of the disclosed sliding rack assembly 100. To facilitate this connection, and as shown in detail in FIG. 4, each of the retention members 122 of the disclosed version includes a holding feature 124 for connecting with one of the retention features 139 of the rear wall retainers 125. Each holding feature 124, as shown, can be formed integral with the outboard retention plate 127 of the corresponding retention member 122 and includes a protrusion 148 extending rearward from the rear end 122b of the outboard retention plate 127. The protrusion 148 in FIG. 4 includes a vertically disposed plate member also defining a retention portion 150 extending upwardly. So configured, when the retention members 122 are connected to the rear wall retainers 125, the holding features 124 are disposed through corresponding apertures 141, as shown in FIG. 4. So disposed, the retention portions 150 can engage or contact rear surfaces 152 of the front walls 137 of the corresponding rear wall retainers 125 to prevent the separation of the retention members 122 from the rear wall retainers 125. This, in effect, locking retention of the retention members 122, thus, stabilizes and secures the entire sliding rack assembly 100 to the rear wall 115 of the cavity 102, when the sliding rack assembly 100 is vertically positioned to the desired height within the cavity 102.

Additionally, as identified in FIG. 1, each aperture 141 can include a width dimension W that is just large enough to allow the protrusion 148 of the holding feature 124 to pass therethrough. So dimensioned, side edges 154 of the apertures 141 operate to at least temporarily contact opposing side lateral faces 148a (one of which can be seen in FIG. 4) of the protrusions 148 to restrict rotating, tipping, or other lateral type movement of the protrusions 148 while residing in the aperture 141. This restriction on the movement of the protrusions 148 prevents tipping of the outboard retention plates 127 and retention members 122, thereby avoiding "toe-in." As such, it should be appreciated that the combination of the retention features 139 and holding features 124 advantageously and simultaneously serves the desired anti-tip and retention functions. Moreover, these functions are provided without necessarily providing vertical support to the sliding rack assembly 100 in the cavity 102. That is, as depicted in FIG. 4, when the retention members 122 are connected to the rear wall retainers 125, a gap G exists between a bottom edge 124a of the holding features 124 and a bottom edge 155 of the corresponding apertures 141. Accordingly, the holding features 124 do not support any of the weight of the sliding rack assembly 100.

Figure 6:
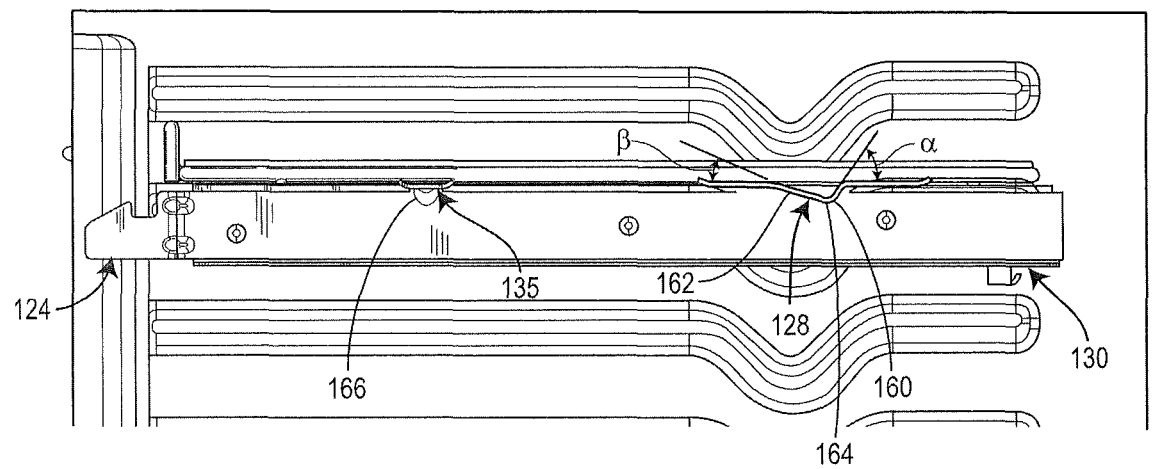
FIG. 6 is a partial side view of the assembly depicted in FIG. 2.

Rather, as mentioned, the sliding rack assembly 100 of the disclosed version is completely supported on the side ribs 119. More specifically, and as shown in FIGS. 1-3 and 6, for example, the disclosed sliding rack assembly 100 is supported on the side ribs 119 of the cavity 102 by way of an integrated cam 128 and a support feature 135 extending laterally outward from the retention members 122. In this version, the integrated cams 128 and support features 135 can be integrally formed with the outboard retention plates 127 of the retention members 122. More specifically, as illustrated in FIG. 3, for example, the present version of the integrated cams 128 and support features 135 are formed to extend laterally outward proximate to top edges 127a of the outboard retention plates 127. The top edges 127a of the outboard retention plates 127 are located above bottom edges 127b of the outboard retention plates 127, relative to the orientation of FIG. 3, for example. As shown in FIG. 6, for example, each of the integrated cams 128 includes a contoured plate having front and rear angled legs 160, 162 angled downward and meeting at a peak 164. The front leg 160 extends at an angle α relative to horizontal and the rear leg 162 extends at an angle β relative to horizontal. In the presently disclosed version, the angle α is greater than the angle β such that the front leg 160 extends toward the apex 164 at a steeper angle than the rear leg 162. This is just an example, however, and other configurations are possible. So configured, when viewed from the side, as depicted in FIG. 6, the integrated cam 128 includes a generally V-shaped profile with the peak 164 positioned at the bottom. Continuing to refer to FIG. 6, the support feature 135 can also include a contoured plate, which in this version, includes a semi-circular profile with a bottom contact point 166.

With the integrated cam 128 and support feature 135 configured as described, these features rest directly on the side ribs 119 when the sliding rack assembly 100 is installed in the cavity 102. Specifically, for each retention member 122, the integrated cam 128 resides in the v-form 121 and rests on the contoured portion 119c of a corresponding side rib 119. Additionally, the contact point 166 of the support feature 135 contacts and rests on the aft portion 119b of the corresponding side rib 119. In order to remove the sliding rack assembly 100 from the cavity 102, the holding features 124 on the retention members 122 must be disconnected with the retention features 139 of the rear wall retainers 125, and the entire assembly 100 can then be slid out of the cavity 102 and off of the ribs 119.

To disconnect the holding and retention features 124, 139, the front of the oven rack assembly 100 must be first lifted and then slid forward out of the front opening 116 of the cavity 102. To help accommodate this displacement, the retention members 122 of the present version further include gripping tabs 130, as shown in FIGS. 1, 2, 5, and 6, for example. The gripping tabs 130 are contoured plates formed integrally with the outboard retention plates 127 and extending downwardly and inwardly therefrom, as shown in FIG. 5. So configured, by pushing the gripping tabs 130 and lifting upward on the front of the assembly 100, the holding features 124 (one of which is shown in detail in FIG. 4) are rotated in the direction of the arrow A in FIG. 4 such that the retention portion 150 of the protrusion 148 displaces downwardly such that the retention portion 150 can clear the front wall 137 of the rear wall retainer 125 at a location immediately above the aperture 141. Once lifted, the user can pull the gripping tabs 130 away from the cavity 102 to slide the holding features 124 out through the apertures 141 of the disclosed version of the retention features 139. At this point, the entire sliding rack assembly 100 can easily be removed from the cavity 102 by sliding along the ribs 119 on the support features 135 and integrated cams 128.

Upon re-installing the sliding rack assembly 100 into the cavity 102, the support features 135 are first aligned with the desired ribs 119 and rested upon fore portions 119a thereof. By pushing the assembly 100 into the cavity 102, the support features 135 slide back along the ribs 119, past the contoured portions 119c and to the aft portions 119b toward the final resting location.

Advantageously, prior to the holding features 124 of the retention members 122 reaching the rear wall retainers 125, the peaks 164 of the integrated cams 128 are allowed to rest on the fore portions 119a of the ribs 119. This situates the entire assembly in a slightly slanted orientation with the front end of the rack higher than the rear end. The integrated cams 128 are designed and configured such that when the peaks 164 rest on the fore portions 119a, the holding features 124 are positioned at the correct angle to facilitate insertion through the apertures 141 of the retention features 139 of the rear wall retainers 125. As the assembly 100 is further pushed into the cavity 102, the integrated cams 128 ultimately reach the contoured portions 119c of the ribs 119, whereby the integrated cams 128 slide down into the v-forms 121. This causes the front portion of the assembly 100 to automatically lower relative to the ribs 119, which in turn, causes the holding features 124 to pivot in a direction opposite to arrow A in FIG. 4 and into the position depicted in FIG. 4, thereby locking the retention members 122 to the rear wall retainers 125.

Thus, based on the foregoing, it should be appreciated that the integrated cams 128 of the disclosed version of the assembly 100 advantageously ensure that the holding features 124 of the retention members 122 easily connect with and disconnect from the retention features 139 of the rear wall retainers 125, as desired.

While the foregoing version of the sliding rack assembly 100 has been described as including rear wall retainers 125 having tabs 143, 145 disposed through slots 144, 146 in the rear wall 115 of the cavity 102, other designs for providing such anti-tip and retention could be constructed differently.

Figure 7:
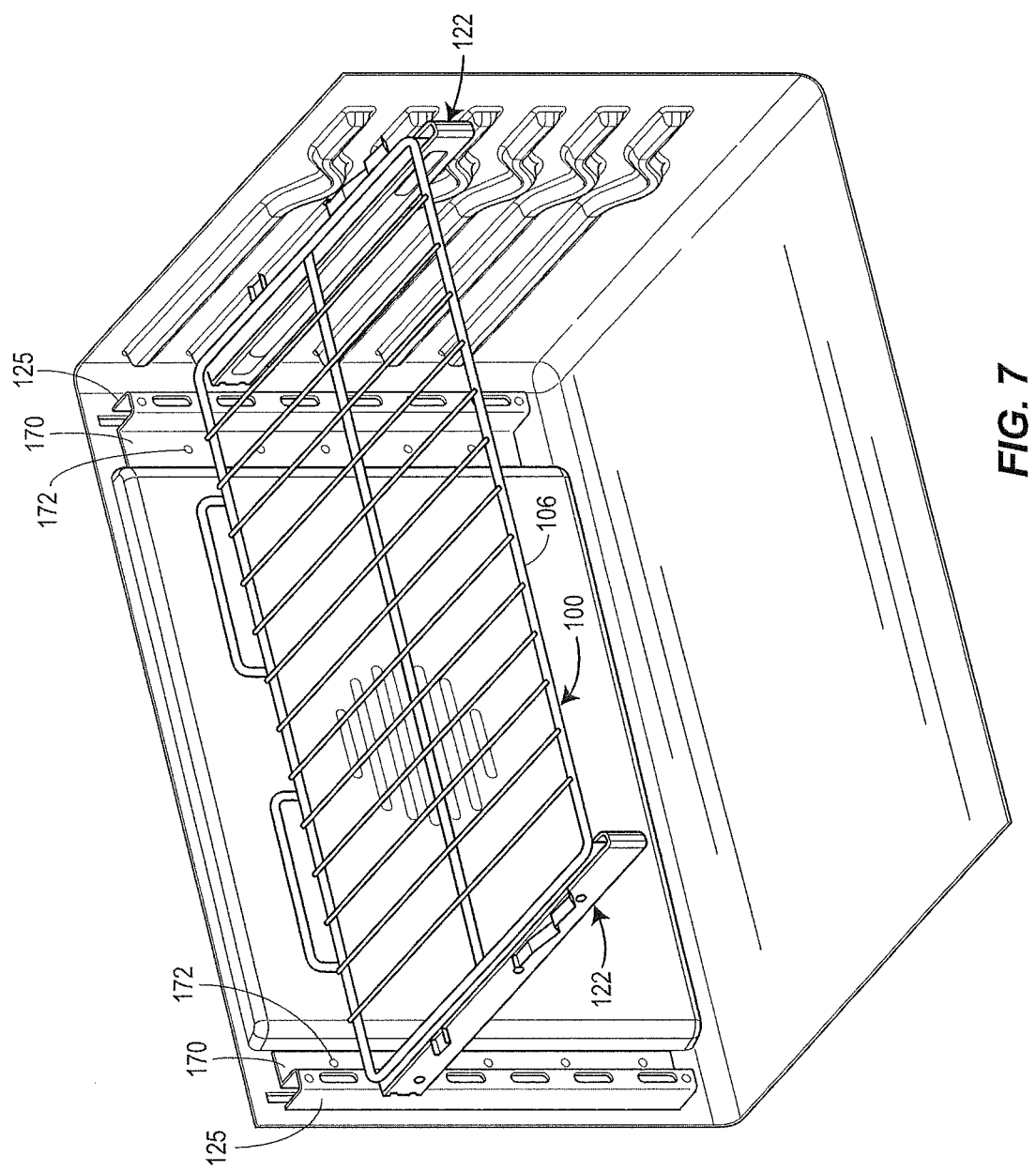
FIG. 7 is a partial perspective view of a second version of a sliding oven rack assembly and oven cavity constructed in accordance with the principles of the present disclosure.

For example, FIG. 7 depicts a second version of the assembly 100 wherein the only distinction is that the rear wall retainers 125 are L-shaped. That is, the rear wall retainers 125 each have a fixation flange 170. The fixation flange 170 includes a flat piece of material extending laterally inward from each of the rear wall retainers 125 and is disposed substantially flush with the rear wall 115 of the cavity 102. As depicted, the fixation flanges 170 include openings 172 for receiving fasteners such as rivet or screws, for example, for fastening the rear wall retainers 125 to the rear wall 115 of the cavity 102. Other versions might not include openings 172, but rather, the fixation flanges 170 can be welded to the rear wall 115. In this version, the rear wall retainers 125 may or may not include the tabs 143, 145 shown in FIG. 2. Nevertheless, these rear wall retainers 125 can be easily added to existing ovens without requiring extensive redesign or reconfiguration of the standard cavity components.

Figure 8:
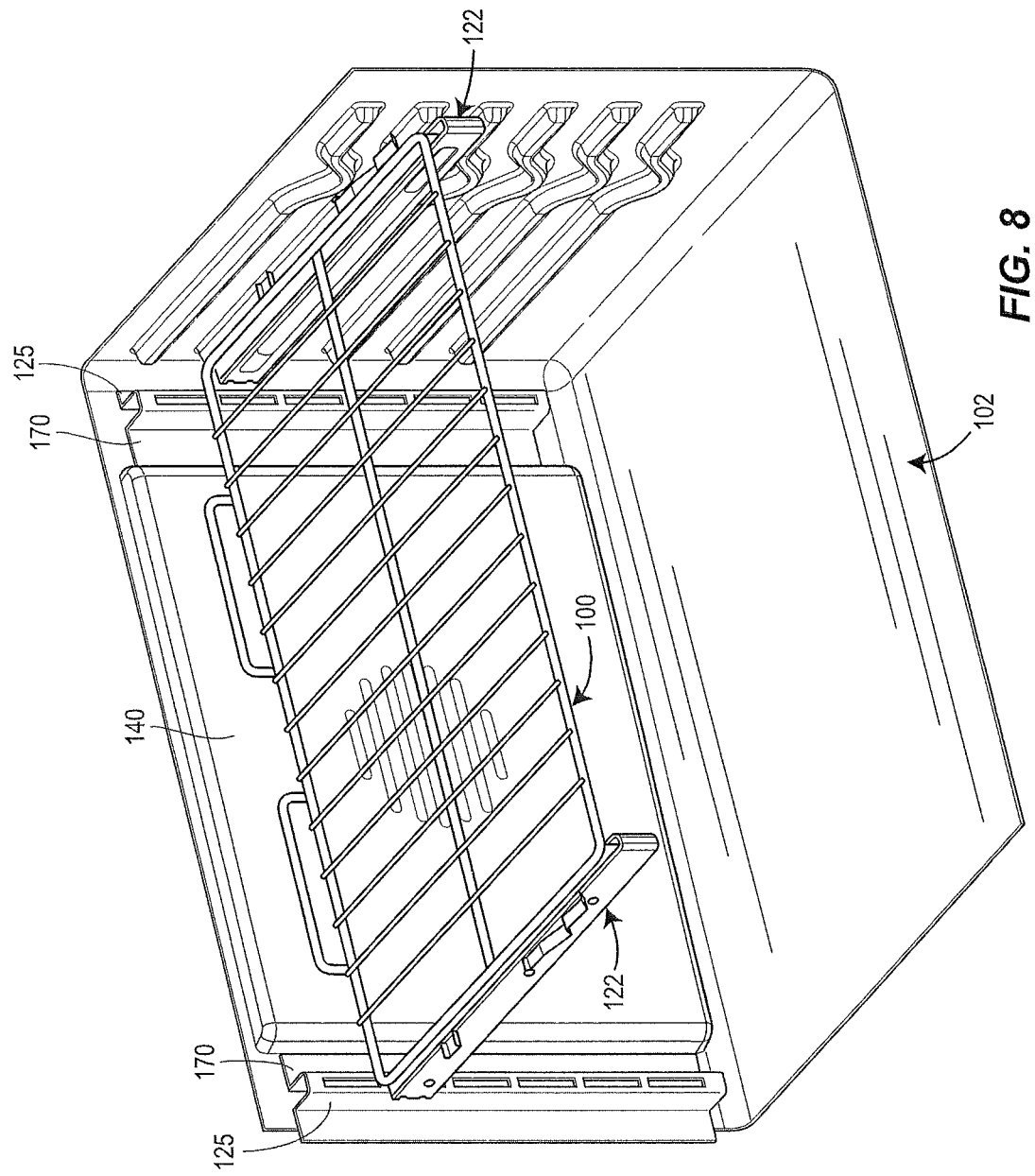
FIG. 8 is a partial perspective view of a third version of a sliding oven rack assembly and oven cavity constructed in accordance with the principles of the present disclosure.

While the foregoing disclosure has described the rear wall retainers 125 as being separate components from the other components of the cavity 102, FIG. 8 shows a third version of the sliding rack assembly 100 of the present disclosure, wherein the rear wall retainers are incorporated as an integral feature of the fan cover 140. That is, the rear wall retainers 125 and the fan cover 140 are one-piece, i.e., are not separate components. As depicted, in this version, the rear wall retainers 125 can include flanges 170 similar to the fixation flanges 170 depicted in FIG. 7, but they do not necessarily include openings for receiving fasteners as the fan cover 140 and rear wall retainers 125 can be fixed into the cavity by whatever means the fan cover 140 is conventionally fastened, or by welding, fasteners, etc.

Figure 9:
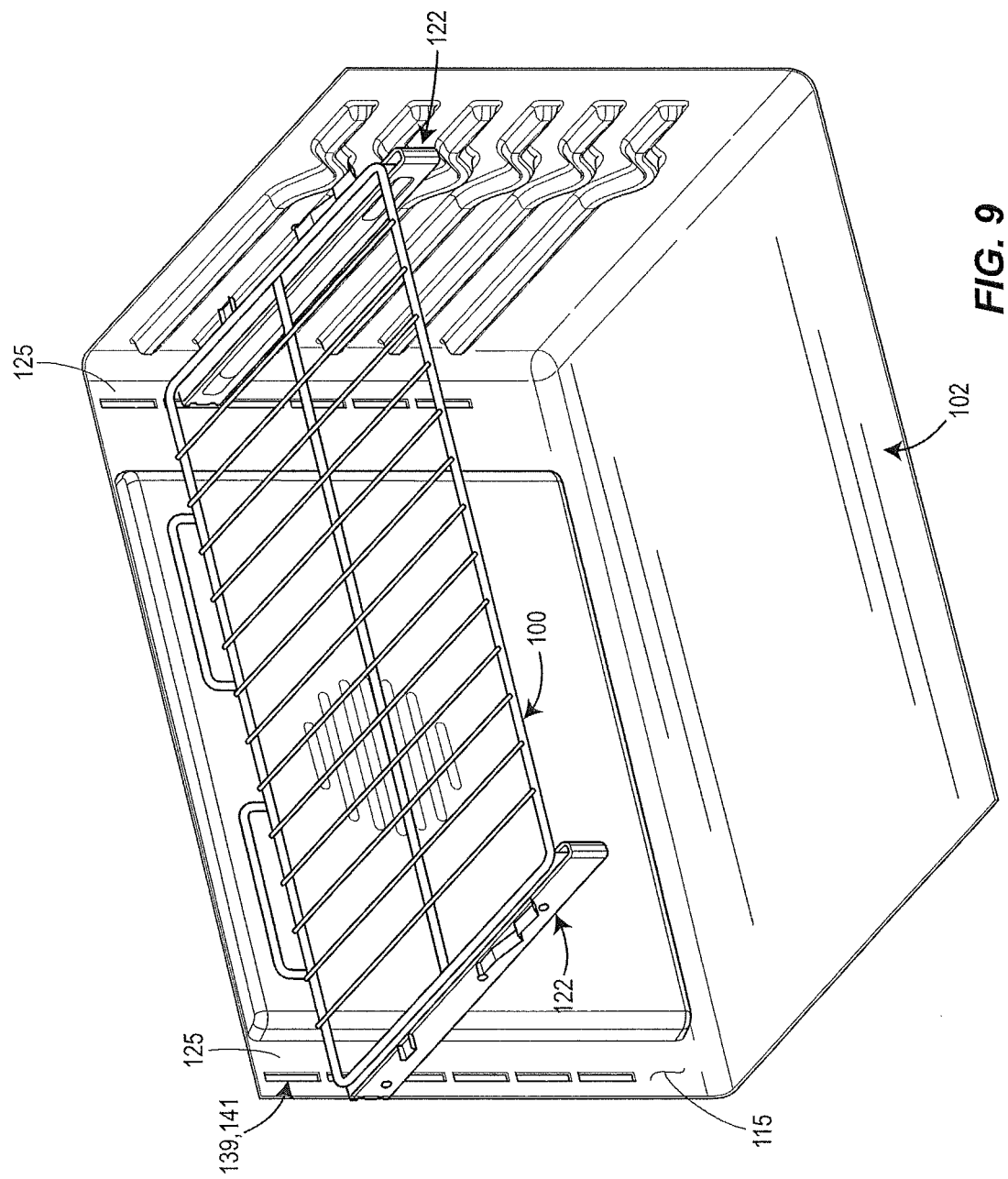
FIG. 9 is a partial perspective view of a fourth version of a sliding oven rack assembly and oven cavity constructed in accordance with the principles of the present disclosure.

While the foregoing disclosure has described the rear wall retainers 125 as being components completely separate from the rear wall 115 of the cavity 102, FIG. 9 depicts a fourth version of the sliding rack assembly 100 of the present disclosure, wherein the rear wall retainers 125 are incorporated as an integral design feature directly in the rear wall 115 of the cavity 102 itself and are not separate components. Accordingly, as shown, the rear wall retainers 125 and, more particularly, the rear wall 115 of the cavity 102 defines the retention features 139 directly therein for receiving the holding features 124 of the retention members 122.

Thus far, the rear wall retainers of the present disclosure have been characterized as including pieces of material with retention features 139 defined by apertures 141 in the material. In an alternate version, however, the rear wall retainers 125 could be arranged similar to rungs on a ladder, whereby the space between the rungs could be defined as being apertures 141. With this version, the rungs may be formed through the use of rivets, studs, screws or the like. So configured, the holding features 124 of the retention members 122 would pass between adjacent rungs and when settled into the position depicted in FIG. 4, for example, the retention portions 150 could abut or otherwise engage the rung located immediately above the protrusion 148 to retain the assembly 100 in the cavity 102.

Figure 10:
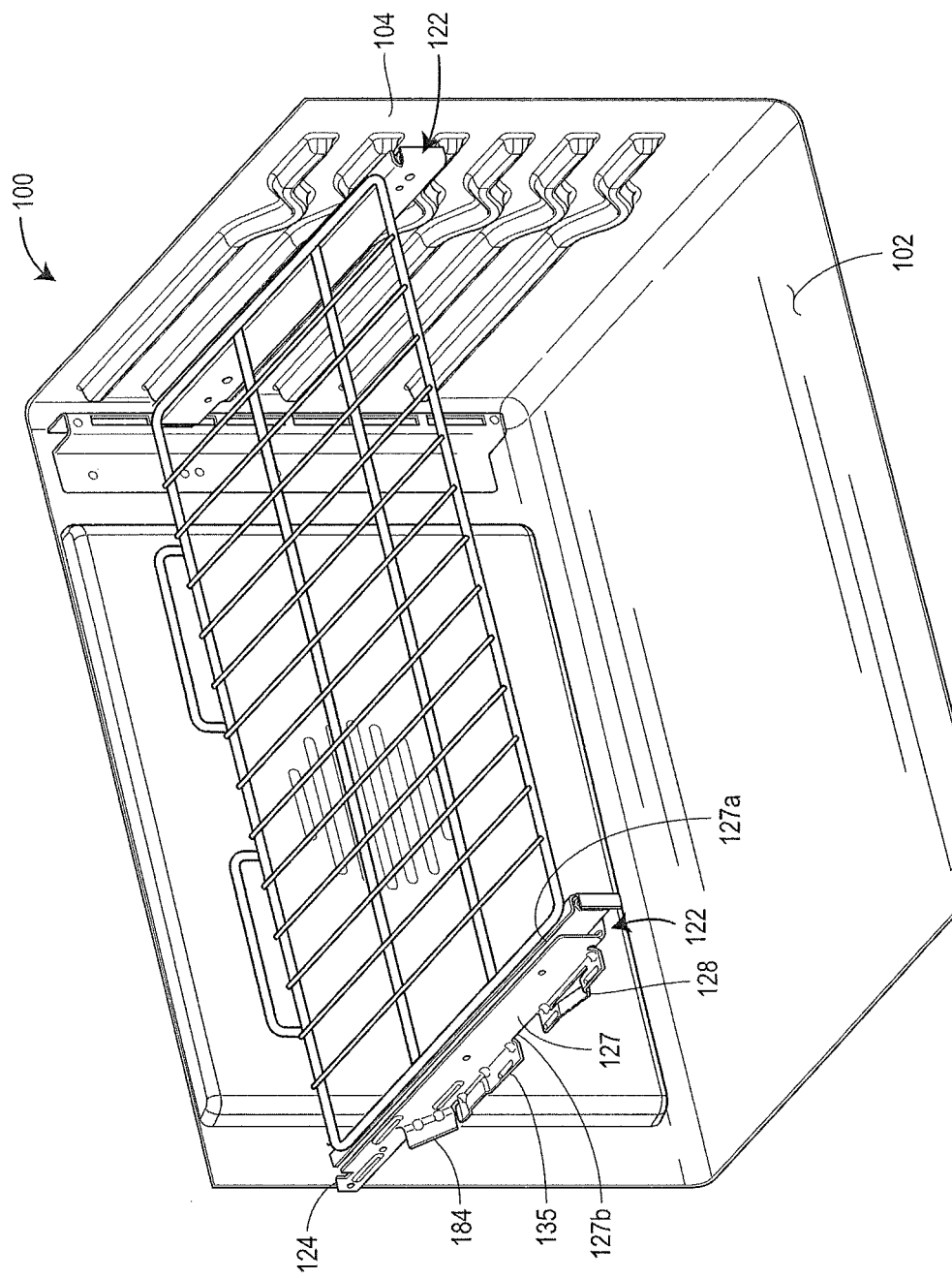
FIG. 10 is a partial perspective view of a fifth version of a sliding oven rack assembly and oven cavity constructed in accordance with the principles of the present disclosure.
Figure 11:
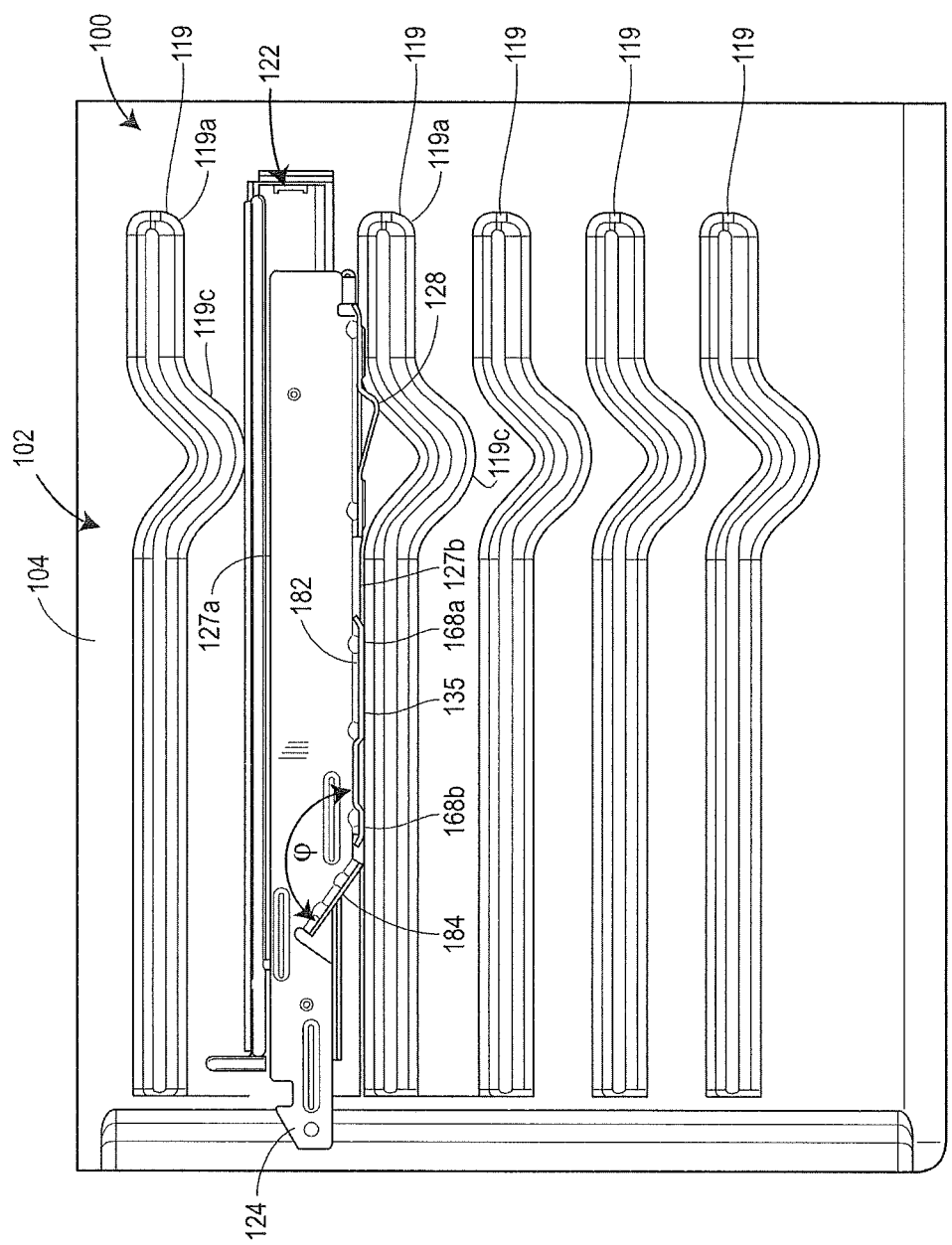
FIG. 11 is a side view of the assembly depicted in FIG. 10.

While the sliding oven rack assemblies 100 of the present disclosure have thus far been depicted and described as having the integrated cams 128 and support features 135 positioned proximate to the top edges 127a of the outboard retention plates 127, as shown in FIGS. 1-4 and 6-9, the present disclosure also includes sliding oven rack assemblies 100 that can be configured differently. For example, FIGS. 10 and 11 depict a fifth version of a sliding oven rack assembly 100 of the present disclosure, which includes integrated cams 128 and support features 135 positioned proximate to the bottom edges 127b of the outboard retention plates 127 of the retention members 122. Generally, the assembly depicted in FIGS. 10 and 11 can be the same as the assemblies 100 described above, except for the distinctions specifically discussed herein including, for example, the position of the integrated cams 128 and support features 135 proximate to the bottom edge 127b of the outboard retention plates 127.

As with prior versions, the integrated cams 128 and support features 135 can be integrally formed with the outboard retention plates 127 or can be separate structures fastened to the plates 127, for example. Positioning the integrated cams 128 and support features 135 proximate to the bottom edges 127b raises the assembly 100 relative to the liner ribs 119 upon which they rest, which might be desirable for a given application, for example. As shown in FIGS. 10 and 11, the integrated cams 128 can be shaped and configured identical to the integrated cams 128 described above with reference to FIG. 6 and therefore their various structural and functional details will not be repeated. The support features 135 in FIGS. 10 and 11 are slightly different from the support features 135 described above. That is, in FIGS. 10 and 11, the support features 135 include generally flat elongated plates extending substantially horizontally outward from the outboard retention plates 127. As identified in FIG. 11, each support feature 135 includes fore and aft supporting faces 168a, 168b separated by a raised gap portion 182. When disposed in the oven, the fore and aft supporting faces 168a, 168b directly engage a top surface of the ribs 119, as shown in FIG. 11, for example, for supporting the assembly 100 in the desired manner similar to the support features 135 described above with reference to FIGS. 1-9, for example.

In addition to the cams 128 and support features 135 being located proximate to the bottom edge 127b of the outboard retention plates 127, the assembly 100 of FIGS. 10 and 11 is further distinct from the assemblies 100 described above in that the outboard retention plates 127 also include installation orientation features 184 located between the support features 135 and the holding features 124. As shown, the installation orientation features 184 include flanges integrally formed with and extending laterally outward from the outboard retention plate 127 in a manner similar to the support features 135 and cams 128. In the depicted form, each installation orientation feature 184 extends within a plane that is disposed at an angle $\phi$ relative to a plane occupied by the immediately adjacent support feature 135. The angle $\phi$ can, be any suitable angle and in one version can be in a range of approximately 115° to approximately 160° and, more specifically, approximately 135°. So configured, the installation orientation features 184 are arranged and configured to prevent a user from installing the assembly 100 upside down within the cavity 102 of the oven 104.

For example, if a user attempts to install the assembly upside down on any given corresponding pair of ribs 119, the installation orientation features 184 would abut up against a bottom of the contoured portions 119c of the immediately superior pair of ribs 119, as soon as the user began sliding the assembly 100 along the fore portions 119a. Thus, the added features advantageously ensure proper orientation of the assembly 100 for installation and operation.

Figure 12:
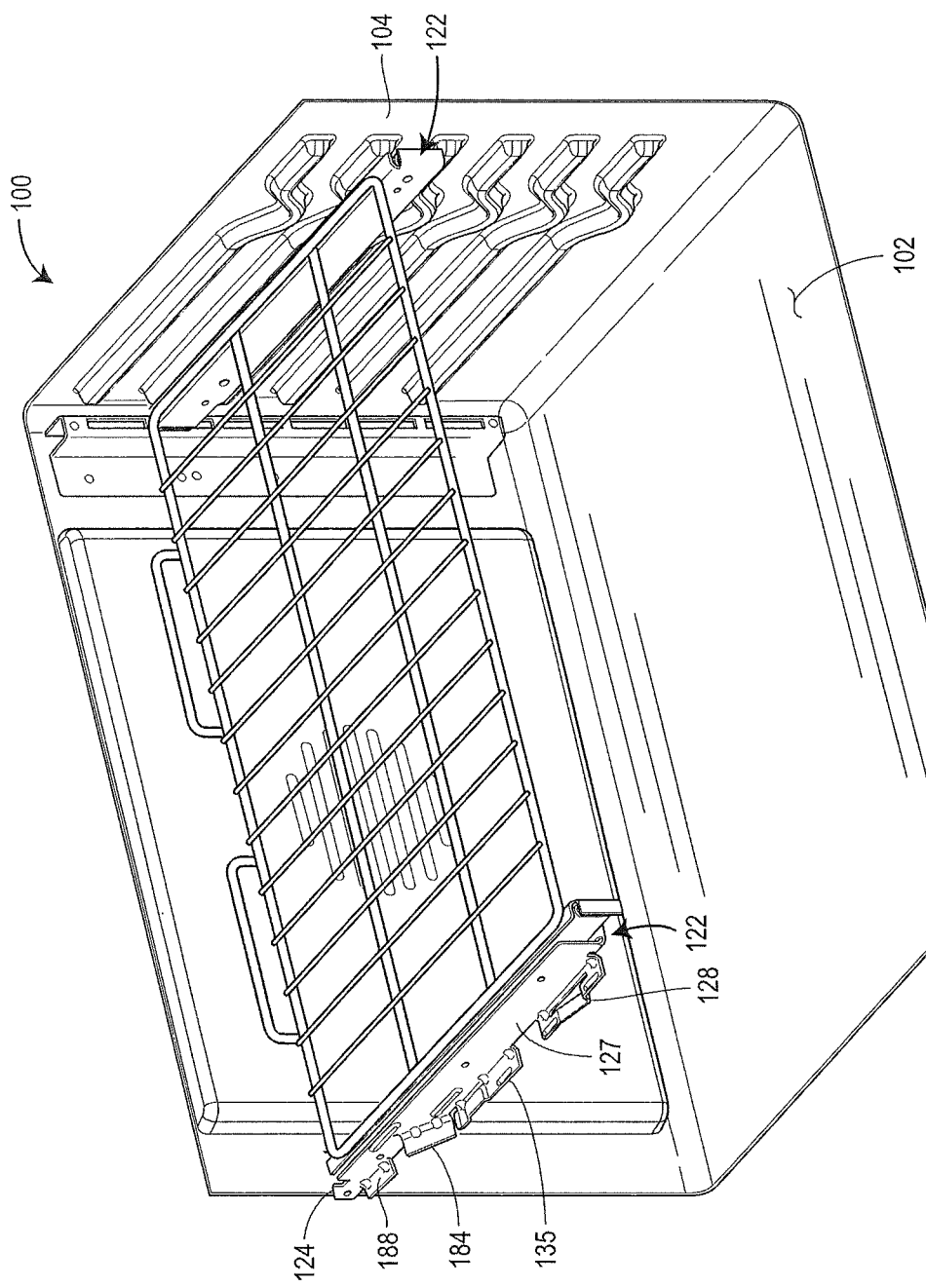
FIG. 12 is a partial perspective view of a sixth version of a sliding oven rack assembly and oven cavity constructed in accordance with the principles of the present disclosure.
Figure 13:
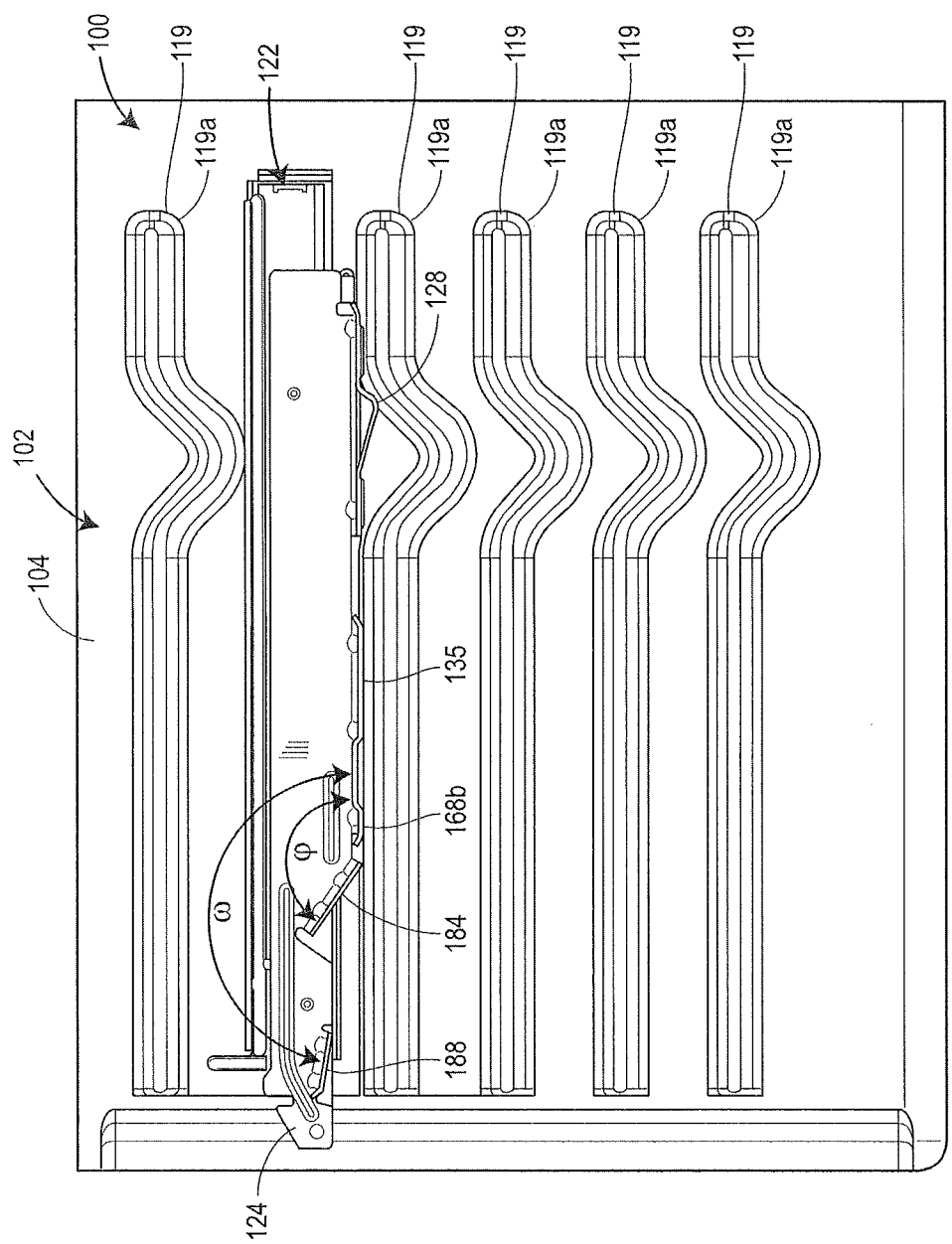
FIG. 13 is a side view of the assembly depicted in FIG. 12.

FIGS. 12 and 13 depict a sixth version of the sliding oven rack assembly 100 that is similar to the version described above with reference to FIGS. 10 and 11, but with the added inclusion of installation aid features 188 extending from the outboard retention plates 127 at locations between the installation orientation features 182 and the holding features 124. Similar to the installation orientation features 184, the installation aid features 188 can include flanges integrally formed with and extending laterally outward from the outboard retention plate 127. In the depicted form, each installation aid feature 188 extends within a plane that is disposed at an angle $\omega$ relative to a plane occupied by the support feature 135 carried by the same outboard retention plate 127. The angle $\omega$ can be, but is not necessarily, greater than the angle $\phi$ of the installation orientation feature 184. Thus, the angle $\omega$ can be any suitable angle and, in one version, can be in a range of approximately 115° to approximately 175° and, more specifically, approximately 160°. So configured, the installation aid features 188 are arranged and configured to assist with installing the sliding oven rack assembly 100 into the cavity 102 of the oven on any given rib 119.

For example, as a user attempts to install the assembly 100 on any given corresponding pair of ribs 119 in the oven 104, the installation aid features 188 immediately engage the fore portions 119a of the ribs 119 and help guide the assembly 100 past the contoured portions 119b, and along the aft portions 119c, as intended. Thus, the added features advantageously assist with proper installation and operation of the assembly 100.

While the installation orientation features 184 and installation aid features 188 disclosed with reference to FIGS. 10-13 are only disclosed with reference to a version of the assembly 100 wherein the cams 128 and support features 135 are positioned proximate to the bottom edge 127*b* of the outboard retention plates 127, it is foreseeable that similar features could be provided on assemblies 100 where the cams 128 and support features 135 are positioned proximate to the top edge 127*a* of the outboard retention plates 127, as disclosed above in FIGS. 1-9, for example.

The discussion herein has thus far been focused on sliding rack assemblies 100 used within ovens containing formed ribs 119 on the liners, but the sliding oven rack assemblies 100 could also be implemented with wire ladders, i.e., ladder racks, utilized as sidewall support structures. Along those lines, any reference to the term "rib" herein is intended to include any side support structure including formed rib liners, ladder racks, or otherwise. In addition, and as mentioned above with respect to the specific construct of the slide assemblies 123 of the retention members 122, the present disclosure may include full or partial extension slides without departing from the novel concepts disclosed herein. Also, different coatings such as nickel, porcelain or any others may be utilized on the improved sliding rack assembly, the walls of the cavity, or any other associated components without departing from the novel concepts disclosed herein. Further still, although the rack 106 depicted in the Figs. generally resembles a completely rigid rack, it is foreseeable that the present disclosure could also be used with other rack configurations known in the industry.

Based on the foregoing, it should be appreciated that the combination of the retention features 139 and holding features 124 of the present disclosure advantageously and simultaneously prevent the sliding rack assembly 100 from being inadvertently slid out of the oven cavity and, moreover, providing the desired amount of integrity to the retention members 122 to prevent tipping which ultimately can result in the detrimental phenomena referred to as "toe-in." Thus, for the sake of this disclosure, the combination of the protrusions 148 and retention portions 150 of the disclosed holding features 124 and the apertures 141 and rear surfaces 152 of the rear wall retainers 125 can be collectively described as a means for retaining the rack 106 and retention members 122 connected to the rear wall 115 of the cavity 102. Additionally, the combination of the protrusions 148 being flat plate members and the apertures 141 in the rear wall retainers 125 including side edges 154 that at least temporarily contact the lateral faces of the protrusions 148 can be collectively described as a means for preventing tipping of the retention members inwardly toward each other.

Because the foregoing solution is provided without requiring a conventional sub-frame for the assembly, the disclosed design is more cost effective and easy to manufacture, ship, and install. Furthermore, because less material is used relative to systems that require a sub-frame, the disclosed sliding rack assembly 100 has less impact on oven pre-heating times, thereby conserving energy and expense.

As to installation, another distinct advantage of the present disclosure is that existing ovens can easily be upgraded and retro-fit to include the disclosed sliding rack assembly 100. That is, because there is no sub-frame or complex side-mounted assembly, the left and right sidewalls 117 of an existing oven liner do not require modification, i.e., they can remain unchanged. Instead, with the disclosed sliding oven rack assemblies 100, an installation method can be as simple as fixing a pair of the rear wall retainers 122 in spaced relation to the rear wall 115 of the cavity 102, positioning the oven rack assembly 100 in the cavity 102 to a selected desired height, and connecting each of the holding features 124 of the retention plates 122 of the assembly 100 with a corresponding retention feature 139 of one of the rear wall retainers 122. With each of the versions of the sliding rack assembly 100 disclosed herein, fixing the rear wall retainers 122 to the rear wall 115 of the cavity 102 includes fixing the rear wall retainers 122 directly to the rear wall 115. Further, with versions of the assembly 100 depicted in the Figs., the installation method can further include inserting the protrusions 148 of the holding features 124 into corresponding apertures 141 formed in the rear wall retainers 125. Additionally, as discussed above, inserting the protrusions 148 can, in some versions, further include engaging the retention portions 150 of the protrusions 148 against back surfaces 152 of the rear wall retainers 125 adjacent to the corresponding apertures 141.

Furthermore, while the foregoing description refers to the cavity sliding rack assembly 100 as being used in conjunction with an oven, this is merely for the sake of description and the rack assembly 100 described herein may also be used in conjunction with any type of appliance and is not limited to ovens or other cooking appliances. As such, while the disclosure suggests that the component features described herein might be made from metal, for other appliances that do not require materials that are such resistant to high heats such as refrigerators, for example, any of the components could equally be formed of plastic or other materials.

Further still, while the description refers to the sliding rack assembly 100 as including a rack 106, which may be understood to be a wire rack, for example, as depicted, the scope of the disclosure is not limited to wire racks, but rather, may include other supporting type surfaces such as shelves, drawers, etc. In fact, for the purposes of this description, the term "rack" is intended to encompass not only support structures within the convention definition of "rack," but also any support type structure including shelves, drawers, or any other type of structure that might be used.

The foregoing description is provided as an example of embodying the present disclosure but is not intended to be limiting of the disclosure or of any invention based thereon. Rather, the scope of any invention based on the disclosure can be defined by the following claims and also includes all equivalents thereof that fall within the spirit and scope of the claims and the disclosure as a whole.

What is claimed is:

1. A sliding rack assembly for residing in an appliance cavity, the assembly comprising:
    a rack;
    a pair of retention members supporting opposing sides of the rack, each retention member including a slide assembly and a retention plate fixed to the slide assembly, the slide assembly for enabling sliding of the rack into and out of the cavity, the retention plate including a front end adapted to be disposed toward an opening of the cavity and a rear end adapted to be disposed toward a rear wall of the cavity, the rear end of the retention plate including a holding feature;
    a pair of rear wall retainers adapted to be fixed to the rear wall of the cavity, each rear wall retainer including a plurality of vertically spaced retention features, each retention feature adapted to connect with the holding feature of one of the pair of retention members to prevent tipping of the retention members inwardly toward each other and to prevent separation of the retention members from the rear wall retainers, wherein the holding feature of the retention plate of each of the retention members includes a protrusion extending rearward of the rear end of the retention plate, the protrusion including an upwardly extending retention portion, and wherein each protrusion includes a vertical plate member.

2. The assembly of claim 1, wherein the rear wall retainers do not vertically support the retention members when connected.

3. The assembly of claim 1, wherein the retention feature of each of the rear wall retainers includes a plurality of vertically spaced apertures for receiving at least portions of the holding features.

4. The assembly of claim 1, wherein the retention feature of each of the rear wall retainers includes a plurality of vertically spaced horizontal rungs separated by apertures for receiving at least portions of the holding features.

5. The assembly of claim 1, wherein each of the rear wall retainers includes a fixation flange for being fastened to the rear wall of the cavity.

6. The assembly of claim 1, further comprising a fan cover that extends between the rear wall retainers, the fan cover and the rear wall retainers being one-piece.

7. The assembly of claim 1, wherein the rear wall retainers and the rear wall of the cavity are one-piece.

8. The assembly of claim 1, wherein each of the retention members further includes an integrated cam and a support feature extending laterally outward from each of the retention plates, the integrated cam and the support feature adapted to support the rack assembly on a side rib in the cavity.

9. The assembly of claim 1, wherein each of the retention members further includes a gripper tab extending downward from the front end of the retention plate, the gripper tab for enabling a user to lift the front ends of the retention members to disconnect the holding features of the retention plates from the retention features of the rear wall retainers.

10. An assembly comprising:
an appliance cavity having a front opening, sidewalls, and a rear wall;
a rack disposed in the cavity;
a pair of retention members supporting opposing sides of the rack in the cavity, each retention member including a slide assembly and a retention plate fixed to the slide assembly, the slide assembly for enabling sliding of the rack into and out of the front opening of the cavity, the retention plates supported on side ribs in the cavity and each including a front end disposed toward the front opening of the cavity and a rear end disposed toward the rear wall of the cavity, the rear end of the retention plate including a holding feature;
a pair of rear wall retainers fixed to the rear wall of the cavity, each rear wall retainer including a plurality of vertically spaced retention features, each retention feature adapted to connect with a holding feature of one of the pair of retention members to prevent tipping of the retention members inwardly toward each other and to prevent separation of the retention members from the rear wall retainers, wherein the holding feature of the retention plate of each of the retention members includes a protrusion extending rearward of the rear end of the retention plate, the protrusion including an upwardly extending retention portion, and wherein each protrusion includes a vertical plate member.

11. The assembly of claim 10, wherein the rear wall retainers do not vertically support the retention members and the rack.

12. The assembly of claim 10, wherein the side ribs in the cavity are formed as one-piece with the sidewalls of the cavity.

13. The assembly of claim 10, wherein the side ribs in the cavity are separate from the sidewalls of the cavity.

14. The assembly of claim 10, wherein the retention feature of each of the rear wall retainers includes a plurality of vertically spaced apertures for at least partially receiving the holding features.

15. The assembly of claim 10, wherein the retention feature of each of the rear wall retainers includes a plurality of vertically spaced horizontal rungs separated by apertures for at least partially receiving the holding features.

16. The assembly of claim 10, wherein each of the rear wall retainers includes a fixation flange fastened to the rear wall of the cavity.

17. The assembly of claim 10, further comprising a fan cover that extends between the rear wall retainers, the fan cover and the rear wall retainers being one-piece.

18. The assembly of claim 10, wherein the rear wall retainers and the rear wall of the cavity are one-piece.

19. The assembly of claim 10, further comprising an integrated cam and a support feature extending laterally outward from each of the retention plates, the integrated cams and the support features adapted to support the rack assembly on the side ribs.

20. The assembly of claim 10, wherein each of the retention members further includes a gripper tab extending downward from the front end of the retention plate, the gripper tabs for enabling a user to lift the front ends of the retention members to disconnect the holding features of the retention plates from the retention features of the rear wall retainers.

21. The assembly of claim 10, wherein the rear wall retainers are fixed directly to the rear wall of the cavity.

22. An anti-tip and retention assembly for use with a sliding rack assembly used in an appliance having a cavity formed at least in part by a rear wall and opposing sidewalls, the sliding rack assembly having a rack and a pair of slide assemblies mounted to opposing side edges of the rack, the slide assemblies supported adjacent to or on the sidewalls for enabling at least partial sliding of the rack into and out of a front opening of the cavity, the anti-tip and retention assembly comprising:
a pair of rear wall retainers adapted to be fixed to the rear wall of the cavity, each rear wall retainer including a plurality of vertically spaced retention features; and
a pair of holding features adapted to be mounted to the slide assemblies of the sliding rack assembly,
whereby when the sliding rack assembly is selectively fully inserted into the oven cavity the holding features of the respective slide assemblies engage the rear wall retainers to provide anti-tip support of the sliding rack assembly within the cavity, and further whereby when the sliding rack assembly is manipulated for removal out of the cavity, the pair of holding features disengage from the rear wall retainers, wherein the holding features are carried by a pair of retention plates adapted to be fixed to the slide assemblies, each holding feature including a protrusion and an upwardly extending retention portion, the protrusion extending rearward of the respective retention plate, and wherein each protrusion includes a vertical plate member.

23. The anti-tip and retention assembly of claim 22, wherein the rear wall retainers do not vertically support the retention members when the sliding rack assembly is in the cavity.

24. The anti-tip and retention assembly of claim 22, wherein the retention feature of each of the rear wall retainers includes a plurality of vertically spaced apertures for receiving the holding features.

25. The anti-tip and retention assembly of claim 22, wherein the retention feature of each of the rear wall retainers includes a plurality of vertically spaced horizontal rungs separated by apertures for receiving the holding features.

26. The anti-tip and retention assembly of claim 22, wherein each of the rear wall retainers includes a fixation flange adapted to be fastened to the rear wall of the cavity.

27. The anti-tip and retention assembly of claim 22, further comprising a fan cover that extends between the rear wall retainers, the fan cover and the rear wall retainers being one-piece.

28. The anti-tip and retention assembly of claim 22, wherein the rear wall retainers are formed as one-piece with the rear wall of the cavity.

29. The anti-tip and retention assembly of claim 22, further comprising an integrated cam and a support feature extending laterally outward from each of the retention plates, the integrated cams and the support features adapted to support the rack assembly on the side ribs.

30. A method of installing a sliding rack assembly into an appliance cavity, the method comprising:
fixing a pair of rear wall retainers in spaced relation to a rear wall of the cavity, each rear wall retainer including a plurality of vertically spaced retention features;
positioning a rack assembly in the cavity, the rack assembly including a rack supported on a pair of spaced apart retention members, each retention member including a slide assembly and a retention plate fixed to the slide assembly, the slide assembly for enabling sliding of the rack into and out of the cavity, the retention plate including a front end disposed toward an opening of the cavity and a rear end disposed toward the rear wall of the cavity, the rear end of the retention plate including a holding feature; and
connecting each of the holding features of the retention plates with a corresponding retention feature of one of the rear wall retainers, this connection for preventing tipping of the retention members inwardly toward each other and separation of the retention members from the rear wall retainers, wherein connecting each of the holding features to a corresponding retention feature includes inserting a protrusion that extends rearwardly from the rear end of the retention plate into one of a plurality of vertically spaced apertures formed in the corresponding rear wall retainer and engaging an upwardly extending retention portion of the protrusion against a back surface of the rear wall retainer adjacent to the aperture, wherein each protrusion includes a vertical plate member.

31. The method of claim 30, wherein fixing the rear wall retainers to the rear wall of the cavity includes fixing the rear wall retainers directly to the rear wall.

32. A sliding rack assembly for residing in an appliance cavity, the assembly comprising:
a rack;
a pair of retention members supporting opposing sides of the rack, each retention member including a slide assembly and a retention plate fixed to the slide assembly, the slide assembly for enabling sliding of the rack into and out of the cavity, the retention plate including a front end adapted to be disposed toward an opening of the cavity and a rear end adapted to be disposed toward a rear wall of the cavity, the rear end of the retention plate including a holding feature;
a pair of rear wall retainers adapted to be fixed to the rear wall of the cavity, each rear wall retainer including a plurality of vertically spaced retention features, each retention feature adapted to connect with the holding feature of one of the pair of retention members to prevent tipping of the retention members inwardly toward each other and to prevent separation of the retention members from the rear wall retainers,
wherein each of the retention members further includes an integrated cam and a support feature extending laterally outward from each of the retention plates, the integrated cam and the support feature adapted to support the rack assembly on a side rib in the cavity.

33. The assembly of claim 32, wherein the rear wall retainers do not vertically support the retention members when connected.

34. The assembly of claim 32, wherein the holding feature of the retention plate of each of the retention members includes a protrusion extending rearward of the rear end of the retention plate.

35. The assembly of claim 34, wherein each protrusion includes a vertical plate member, and wherein the retention feature of each of the rear wall retainers includes a plurality of vertically spaced apertures for receiving at least portions of the holding features.

36. The assembly of claim 34, wherein each protrusion includes a vertical plate member, and wherein the retention feature of each of the rear wall retainers includes a plurality of vertically spaced horizontal rungs separated by apertures for receiving at least portions of the holding features.

37. The assembly of claim 32, wherein each of the rear wall retainers includes a fixation flange for being fastened to the rear wall of the cavity.

38. The assembly of claim 32, further comprising a fan cover that extends between the rear wall retainers, the fan cover and the rear wall retainers being one-piece.

39. The assembly of claim 32, wherein the rear wall retainers and the rear wall of the cavity are one-piece.

40. The assembly of claim 32, wherein each of the retention members further includes a gripper tab extending downward from the front end of the retention plate, the gripper tab for enabling a user to lift the front ends of the retention members to disconnect the holding features of the retention plates from the retention features of the rear wall retainers.

41. An assembly comprising:
an appliance cavity having a front opening, sidewalls, and a rear wall;
a rack disposed in the cavity;
a pair of retention members supporting opposing sides of the rack in the cavity, each retention member including a slide assembly and a retention plate fixed to the slide assembly, the slide assembly for enabling sliding of the rack into and out of the front opening of the cavity, the retention plates supported on side ribs in the cavity and each including a front end disposed toward the front opening of the cavity and a rear end disposed toward the rear wall of the cavity, the rear end of the retention plate including a holding feature;
a pair of rear wall retainers fixed to the rear wall of the cavity, each rear wall retainer including a plurality of vertically spaced retention features, each retention feature adapted to connect with a holding feature of one of the pair of retention members to prevent tipping of the retention members inwardly toward each other and to prevent separation of the retention members from the rear wall retainers; and
an integrated cam and a support feature extending laterally outward from each of the retention plates, the integrated cams and the support features adapted to support the rack assembly on the side ribs.

42. The assembly of claim 41, wherein the rear wall retainers do not vertically support the retention members and the rack.

43. The assembly of claim 41, wherein the side ribs in the cavity are formed as one-piece with the sidewalls of the cavity.

44. The assembly of claim 41, wherein the side ribs in the cavity are separate from the sidewalls of the cavity.

45. The assembly of claim 41, wherein the holding feature of the retention plate of each of the retention members includes a protrusion extending rearward of the rear end of the retention plate, the protrusion including an upwardly extending retention portion.

46. The assembly of claim 45, wherein each protrusion includes a vertical plate member, and wherein the retention feature of each of the rear wall retainers includes a plurality of vertically spaced apertures for at least partially receiving the holding features.

47. The assembly of claim 45, wherein each protrusion includes a vertical plate member wherein the retention feature of each of the rear wall retainers includes a plurality of vertically spaced horizontal rungs separated by apertures for at least partially receiving the holding features.

48. The assembly of claim 41, wherein each of the rear wall retainers includes a fixation flange fastened to the rear wall of the cavity.

49. The assembly of claim 41, further comprising a fan cover that extends between the rear wall retainers, the fan cover and the rear wall retainers being one-piece.

50. The assembly of claim 41, wherein the rear wall retainers and the rear wall of the cavity are one-piece.

51. The assembly of claim 41, wherein each of the retention members further includes a gripper tab extending downward from the front end of the retention plate, the gripper tabs for enabling a user to lift the front ends of the retention members to disconnect the holding features of the retention plates from the retention features of the rear wall retainers.

52. The assembly of claim 41, wherein the rear wall retainers are fixed directly to the rear wall of the cavity.

53. An anti-tip and retention assembly for use with a sliding rack assembly used in an appliance having a cavity formed at least in part by a rear wall and opposing sidewalls, the sliding rack assembly having a rack and a pair of slide assemblies mounted to opposing side edges of the rack, the slide assemblies supported adjacent to or on the sidewalls for enabling at least partial sliding of the rack into and out of a front opening of the cavity, the anti-tip and retention assembly comprising:
a pair of rear wall retainers adapted to be fixed to the rear wall of the cavity, each rear wall retainer including a plurality of vertically spaced retention features;
a pair of holding features adapted to be mounted to the slide assemblies of the sliding rack assembly; and
a fan cover that extends between the rear wall retainers, the fan cover and the rear wall retainers being one-piece,
whereby when the sliding rack assembly is selectively fully inserted into the oven cavity the holding features of the respective slide assemblies engage the rear wall retainers to provide anti-tip support of the sliding rack assembly within the cavity, and further whereby when the sliding rack assembly is manipulated for removal out of the cavity, the pair of holding features disengage from the rear wall retainers.

54. The anti-tip and retention assembly of claim 53, wherein the rear wall retainers do not vertically support the retention members when the sliding rack assembly is in the cavity.

55. The anti-tip and retention assembly of claim 53, wherein the holding features are carried by a pair of retention plates adapted to be fixed to the slide assemblies, each holding feature including a protrusion and an upwardly extending retention portion, the protrusion extending rearward of the respective retention plate.

56. The anti-tip and retention assembly of claim 55, further comprising an integrated cam and a support feature extending laterally outward from each of the retention plates, the integrated cams and the support features adapted to support the rack assembly on the side ribs.

57. The anti-tip and retention assembly of claim 53, wherein the retention feature of each of the rear wall retainers includes a plurality of vertically spaced apertures for receiving the holding features.

58. The anti-tip and retention assembly of claim 53, wherein the retention feature of each of the rear wall retainers includes a plurality of vertically spaced horizontal rungs separated by apertures for receiving the holding features.

59. The anti-tip and retention assembly of claim 53, wherein each of the rear wall retainers includes a fixation flange adapted to be fastened to the rear wall of the cavity.

60. The anti-tip and retention assembly of claim 53, wherein the rear wall retainers are formed as one-piece with the rear wall of the cavity.

61. An anti-tip and retention assembly for use with a sliding rack assembly used in an appliance having a cavity formed at least in part by a rear wall and opposing sidewalls, the sliding rack assembly having a rack and a pair of slide assemblies mounted to opposing side edges of the rack, the slide assemblies supported adjacent to or on the sidewalls for enabling at least partial sliding of the rack into and out of a front opening of the cavity, the anti-tip and retention assembly comprising:
a pair of rear wall retainers adapted to be fixed to the rear wall of the cavity, each rear wall retainer including a plurality of vertically spaced retention features;
a pair of holding features adapted to be mounted to the slide assemblies of the sliding rack assembly, wherein the holding features are carried by a pair of retention plates adapted to be fixed to the slide assemblies, each holding feature including a protrusion and an upwardly extending retention portion, the protrusion extending rearward of the respective retention plate; and
an integrated cam and a support feature extending laterally outward from each of the retention plates, the integrated cams and the support features adapted to support the rack assembly on the side ribs,
whereby when the sliding rack assembly is selectively fully inserted into the oven cavity the holding features of the respective slide assemblies engage the rear wall retainers to provide anti-tip support of the sliding rack assembly within the cavity, and further whereby when the sliding rack assembly is manipulated for removal out of the cavity, the pair of holding features disengage from the rear wall retainers.

62. The anti-tip and retention assembly of claim 61, wherein the rear wall retainers do not vertically support the retention members when the sliding rack assembly is in the cavity.

63. The anti-tip and retention assembly of claim 61, wherein the retention feature of each of the rear wall retainers includes a plurality of vertically spaced apertures for receiving the holding features.

64. The anti-tip and retention assembly of claim 61, wherein the retention feature of each of the rear wall retainers includes a plurality of vertically spaced horizontal rungs separated by apertures for receiving the holding features.

65. The anti-tip and retention assembly of claim 61, wherein each of the rear wall retainers includes a fixation flange adapted to be fastened to the rear wall of the cavity.

66. The anti-tip and retention assembly of claim 61, further comprising a fan cover that extends between the rear wall retainers, the fan cover and the rear wall retainers being one-piece.

67. The anti-tip and retention assembly of claim 61, wherein the rear wall retainers are formed as one-piece with the rear wall of the cavity.

* * * * *